June 15, 1926.

H. FLINTHAM

TIRE LOCK

Filed Feb. 27, 1922

1,588,721

Inventor
Harry Flintham

By

Attorneys

Patented June 15, 1926.

1,588,721

UNITED STATES PATENT OFFICE.

HARRY FLINTHAM, OF DETROIT, MICHIGAN.

TIRE LOCK.

Application filed February 27, 1922. Serial No. 539,669.

This invention relates to a tire locking device applicable to a conventional form of spare tire carrier and adapted to prevent accidental displacement and theft of a tire relative to its carrier.

My invention aims to provide a tire locking device embodying a bracket that is fixed to a tire carrier, and a hook shaped arm or member that will embrace a portion of the tire and cooperate with the tire carrier in preventing theft of the tire. The hook shaped member is adapted to be detachably connected to the bracket by a lock and also by a fastener, the latter relieving the shock of any stresses or strains due to the weight of the hook shaped member or a tire thereon.

The construction entering into my invention will be hereinafter specifically described and then claimed, and reference will now be had to the drawing, wherein:—

Figures 1, 2, 3:
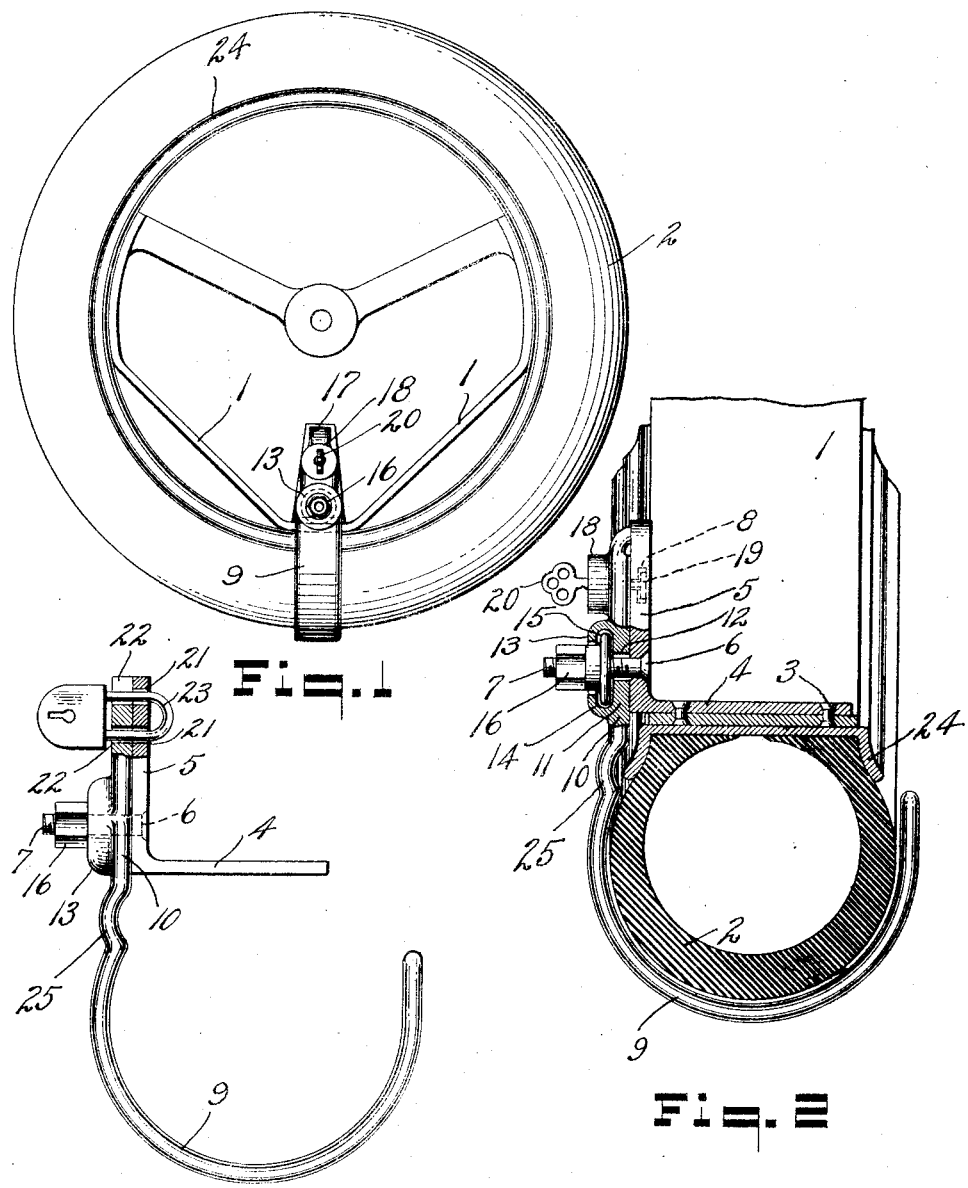
Figure 1 is a front elevation of a spare tire carrier with a tire thereon and showing my locking device in position.
Fig. 2 is a cross sectional view of the same on an enlarged scale with a portion of the locking device in side elevation.
Fig. 3 is a side elevation of the locking device, illustrating a padlock in connection therewith.

In the drawing, the reference numeral 1 denotes a conventional form of spare tire carrier adapted to support an outer tire casing 2 and a tire rim 24, a complete tire or any part thereof which may be placed circumferentially of the carrier. Riveted or otherwise connected to the lower wall of the carrier, as at 3, is a bracket 4 having an upright portion 5 in a plane parallel to the carrier 1 and in substantially the same plane as the flange of the rim 24. Soldered or otherwise fixed in the upright 5 of the bracket 4 is a head 6 of a screw member 7, and in the upper end of the upright 5 is a bolt recess 8.

The reference numeral 9 denotes a hook shaped member adapted to embrace the tread or lower peripheral portion of the tire 2, said member having an arm 10 which is placed over the screw member 7 and against the upright 5 of the bracket 4. The arm 10 has an offset portion 25 providing holding means for the rim flange and on the arm 10 is an enlargement 11 having an opening 12 to receive the screw member 7. The edges 13 of the enlargement 11 are peened or inturned to form a recess 14 in which is loosely mounted the collar 15 of a nut 16 which protrudes from the enlargement and has facets to facilitate rotating the nut. There is sufficient clearance between the hook shaped member 9 and the tire 2 to permit of the nut being screwed on the screw member 7 to clamp the arm 10 against the upright 5 of the bracket 4.

The upper end of the arm 10 may abut or fit in the upper end of the upright 5, as at 17 and adjacent the upper end of the arm 10 is a lock body 18 having a rotatable bolt 19 which may be actuated by a key 20. The bolt 19 is adapted to enter the recess 8 of the upright 5 and be turned by the key 20 to lock the arm 10 in engagement with the bracket, so that the hook shaped member cannot be surreptitiously removed.

In lieu of the lock body 18 and its appurtenant parts, I may provide the upright 5 of the bracket 4 with openings 21 with which openings or slots 22 of the arm 10 may register and permit of a padlock shackle 23 connecting the arm 10 to the upright 5 so that the hook shaped member cannot be removed until released by the padlock.

In practice the hook shaped member 9 is placed in engagement with the tire 2 and said tire shifted on to the carrier 1, and as this is accomplished the nut 16 is screwed on the screw member 7 until the tire and its rim are fully on said carrier.

It is thought that the operation and utility of my tire locking device will be apparent without further description, and while in the drawing there are illustrated the preferred embodiments of my invention, it is to be understood that the structural elements are susceptible to such variations and modifications as fall within the scope of the appended claim.

What I claim is:—

Means adapted for holding a spare tire on a tire carrier, comprising an angle bracket having an apertured leg, a screw member projecting from the lower part of said bracket, a hook shaped member having its hook portion under said bracket and adapted to embrace a tire on the carrier, said hook shaped member extending alongside the leg of said bracket, said member having a recess therein through which extends said screw member, said member adapted to have its upper end extend into the aperture of the leg of said bracket, a nut having a peripheral flange loosely held in the recess of said hook shaped member by a peened-in wall of the member recess and adapted to be rotated in said recess to be screwed on the screw member of said bracket, and locking means between said screw member and the apertured end of said bracket adapted for securing said hook shaped member to said bracket.

In testimony whereof I affix my signature.

HARRY FLINTHAM.